US008649962B2

(12) United States Patent
Davis et al.

(10) Patent No.: US 8,649,962 B2
(45) Date of Patent: Feb. 11, 2014

(54) PLANNING A ROUTE FOR A CONVOY OF AUTOMOBILES

(75) Inventors: Michelle Davis, Raleigh, NC (US); Angela Richards Jones, Durham, NC (US); Ruthie D. Lyle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 13/329,651

(22) Filed: Dec. 19, 2011

(65) Prior Publication Data

US 2013/0158845 A1    Jun. 20, 2013

(51) Int. Cl.
G06G 7/76 (2006.01)
G08G 1/00 (2006.01)

(52) U.S. Cl.
USPC .......................................... 701/117; 701/400

(58) Field of Classification Search
USPC ........................................... 701/400, 23, 117
See application file for complete search history.

(56) References Cited

U.S. PATENT DOCUMENTS

| | | | |
|---|---|---|---|
| 6,032,097 A * | 2/2000 | Iihoshi et al. | 701/96 |
| 6,868,333 B2 | 3/2005 | Melen | |
| 7,969,324 B2 | 6/2011 | Chevion et al. | |
| 2003/0069683 A1 | 4/2003 | Lapidot et al. | |
| 2003/0100326 A1 * | 5/2003 | Grube et al. | 455/515 |
| 2007/0106465 A1 | 5/2007 | Adam et al. | |
| 2008/0059007 A1 | 3/2008 | Whittaker et al. | |
| 2008/0134955 A1 * | 6/2008 | Morrow | 116/28 R |
| 2009/0012666 A1 * | 1/2009 | Simpson et al. | 701/23 |
| 2009/0079839 A1 * | 3/2009 | Fischer et al. | 348/218.1 |
| 2009/0118889 A1 * | 5/2009 | Heino et al. | 701/24 |
| 2009/0157461 A1 * | 6/2009 | Wright et al. | 705/8 |
| 2010/0256836 A1 | 10/2010 | Mudalige | |
| 2010/0256852 A1 | 10/2010 | Mudalige | |
| 2011/0093177 A1 | 4/2011 | Horn | |
| 2011/0208399 A1 | 8/2011 | Fekete et al. | |

OTHER PUBLICATIONS

Dao, et al., "Distributed Platoon Assignment and Lane Selection for Traffic Flow Optimization", 2008 IEEE Intelligent Vehicles Symposium, Jun. 4-6, 2008, pp. 739-744, ISBN: 978-1-4244-2568-6, Eindhoven University of Technology, Eindhoven, The Netherlands.
"Welcome to the Convoy Control Page", URL: http://www.flmvpa.org/convoy.htm, accessed Dec. 5, 2011, 6 pages.
"Adaptive Risk-based Convoy Route Planning—MilcordWiki", URL: http://wiki.milcord.com/index.php/Adaptive_Risk-based_Convoy_Route_Planning, accessed Dec. 5, 2011, 3 pages.
"The Caravan Club", URL: http://www.caravanclub.co.uk/planning-your-trip/weather-and-route-planning/route-planning, accessed Dec. 5, 2011, 1 page.
"Route Planner app: information from the AA for your iPhone—The AA", URL: http://www.theaa.com/iphone/route-planner-iphone-app.html, accessed Dec. 5, 2011, 1 page.

* cited by examiner

*Primary Examiner* — Yonel Beaulieu
(74) *Attorney, Agent, or Firm* — Edward J. Lenart; Katherine S. Brown; Biggers Kennedy Lenart Spraggins LLP (57) ABSTRACT

Planning a route for a convoy of automobiles, including: identifying a plurality of automobiles included in a convoy; planning, for the convoy by a route planning module, a route from an origin to a destination in dependence upon current automobile traffic between the origin and the destination, automobile characteristics of the convoy, and aggregate user preferences of convoy automobile users; and providing for display, by the route planning module to a route display module of each automobile in the convoy, the convoy's route.

17 Claims, 5 Drawing Sheets

PLANNING A ROUTE FOR A CONVOY OF AUTOMOBILES

BACKGROUND OF THE INVENTION

1. Field of the Invention

The field of the invention is data processing, or, more specifically, methods, apparatus, and products for planning a route for a convoy of automobiles.

2. Description of Related Art

Current navigation devices, handheld and for automobiles, are not capable of planning a route for a convoy of automobiles. Instead, most navigation devices are configured to plan a route for only a single automobile. A convoy of automobiles, however, may have many features that necessitate a different route to planned than that which is planned for a single automobile. A convoy including a hybrid or all-electric automobile, for example, may require a different route than one planned for a single, combustible fuel engine automobile. Further, drivers of the automobiles of the convoy may have many and sometimes varying preferences that would require a route to be different than a route for any single automobile in the convoy.

In addition to requiring a different route than a single automobile, convoys also generate different traffic patterns than a single automobile and generally effect traffic to a greater degree than a single automobile. To that end, a driver of an automobile may be benefited by driving in a manner that does not intersect a convoy. Although traffic data suppliers today are configured to provide real-time traffic data to navigation devices, such traffic data suppliers currently do not provide convoy-specific routes to non-convoy navigation devices.

SUMMARY OF THE INVENTION

Methods, apparatus, and products for planning a route for a convoy of automobiles are disclosed in this specification. Such planning includes: identifying a plurality of automobiles included in a convoy; planning, for the convoy by a route planning module, a route from an origin to a destination in dependence upon current automobile traffic between the origin and the destination, automobile characteristics of the convoy, and aggregate user preferences of convoy automobile users; and providing for display, by the route planning module to a route display module of each automobile in the convoy, the convoy's route.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
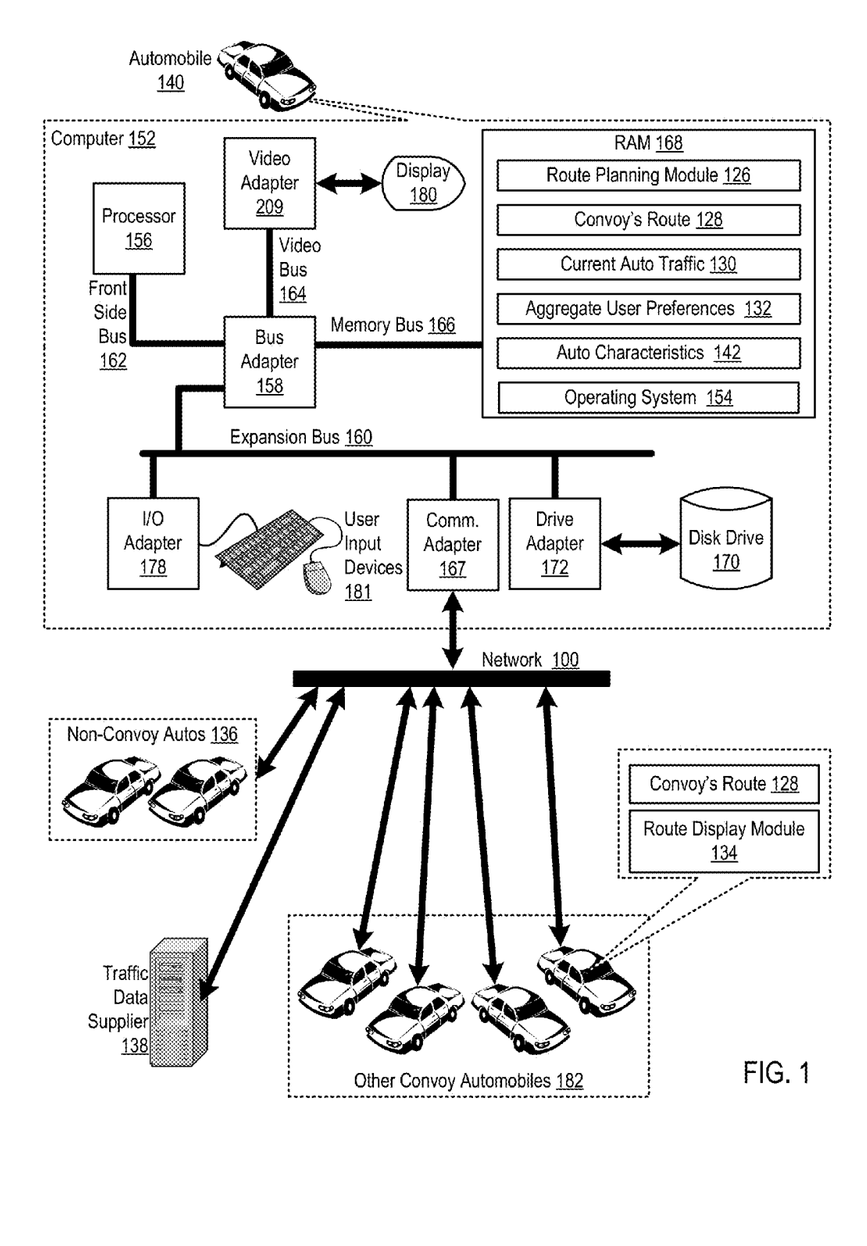
FIG. 1 sets forth a network diagram of a system for planning a route for a convoy of automobiles according to embodiments of the present invention.

Exemplary methods, apparatus, and products for planning a route for a convoy of automobiles in accordance with the present invention are described with reference to the accompanying drawings, beginning with FIG. 1. FIG. 1 sets forth a network diagram of a system for planning a route for a convoy of automobiles according to embodiments of the present invention. The term 'automobile' as used in this specification refers to any vehicle for which a route may be planned. Examples of vehicles include 4-wheel motor vehicles (cars, trucks, and the like), 2-wheel motor vehicles (mopeds, motorcycles, and the like), many wheeled vehicles (18-wheel semi-trailers and the like), and non-motor vehicles (bicycles and the like).

The system of FIG. 1 includes automated computing machinery comprising an exemplary computer (152) useful in planning a route for a convoy of automobiles according to embodiments of the present invention. The computer may be implemented in various ways, such as a navigation device or 'GPS' (Global Positioning Satellite) unit or the like. In the example of FIG. 1, the computer (152) is implemented as part of an automobile (140). Readers of skill in the art will recognize that this is but one way among many that such a computer (152) configured for planning a route for a convoy of automobiles may be implemented. The computer (152) may also be implemented as a stand-alone device, separate from the automobile, or as some hybrid device that may, at times, operate as a stand-alone device and, at other times, couple with other computing systems of the automobile for data communications.

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a route planning module, a module of computer program instructions for planning a route between an origin and a destination and improved for planning a route for a convoy of automobiles according to embodiments of the present invention. The route planning module (126) of FIG. 1 supports planning a route for a convoy in accordance with embodiments of the present invention by: identifying automobiles (182, 140) included in a convoy; planning, for the convoy, a route (128) from an origin to a destination in dependence upon current automobile traffic (130) between the origin and the destination, automobile characteristics (142) of the convoy, and aggregate user preferences (132) of convoy automobile users; and providing for display, to a route display module (134) of each automobile (182, 140) in the convoy, the convoy's route (128).

Once the convoy's route (128) is planned, the route planning module (126) reports the convoy's route (128) to a traffic data supplier (138). A route planning module (126) of non-convoy automobiles (136) may then receive the convoy's route (128) from the traffic data supplier (138); creating, in dependence upon the convoy's route (128), a non-convoy route that avoids intersections with the convoy's route; and provide for display, to a non-convoy route display module of the automobile not included in the convoy, the non-convoy route.

Readers of skill in the art will recognize that a route planning module (126) of a non-convoy automobile (136) may be implemented as automated computing machinery similar to some degree to the computer (152) that executes the convoy's route planning module (126) in the example of FIG. 1. Automated computing machinery implemented in a non-convoy automobile—or a navigation device associated with such an automobile—may be implemented with some combination of a computer processor, RAM, a bus adapter, a communications adapter, and the like.

Returning back to the computer (152): also stored in RAM (168) of the computer (152) is an operating system (154). Operating systems useful in planning a route for a convoy of automobiles according to embodiments of the present invention include UNIX™ Linux™ Microsoft XP™, AIX™ IBM's i5/OS™ and others as will occur to those of skill in the art. The operating system (154) and the route planning module (126) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for planning a route for a convoy of automobiles according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for planning a route for a convoy of automobiles according to embodiments of the present invention include modems for wired dial-up communications, Ethernet (IEEE 802.3) adapters for wired data communications network communications, and 802.11 adapters for wireless data communications network communications.

The arrangement of computers, automobiles, networks, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
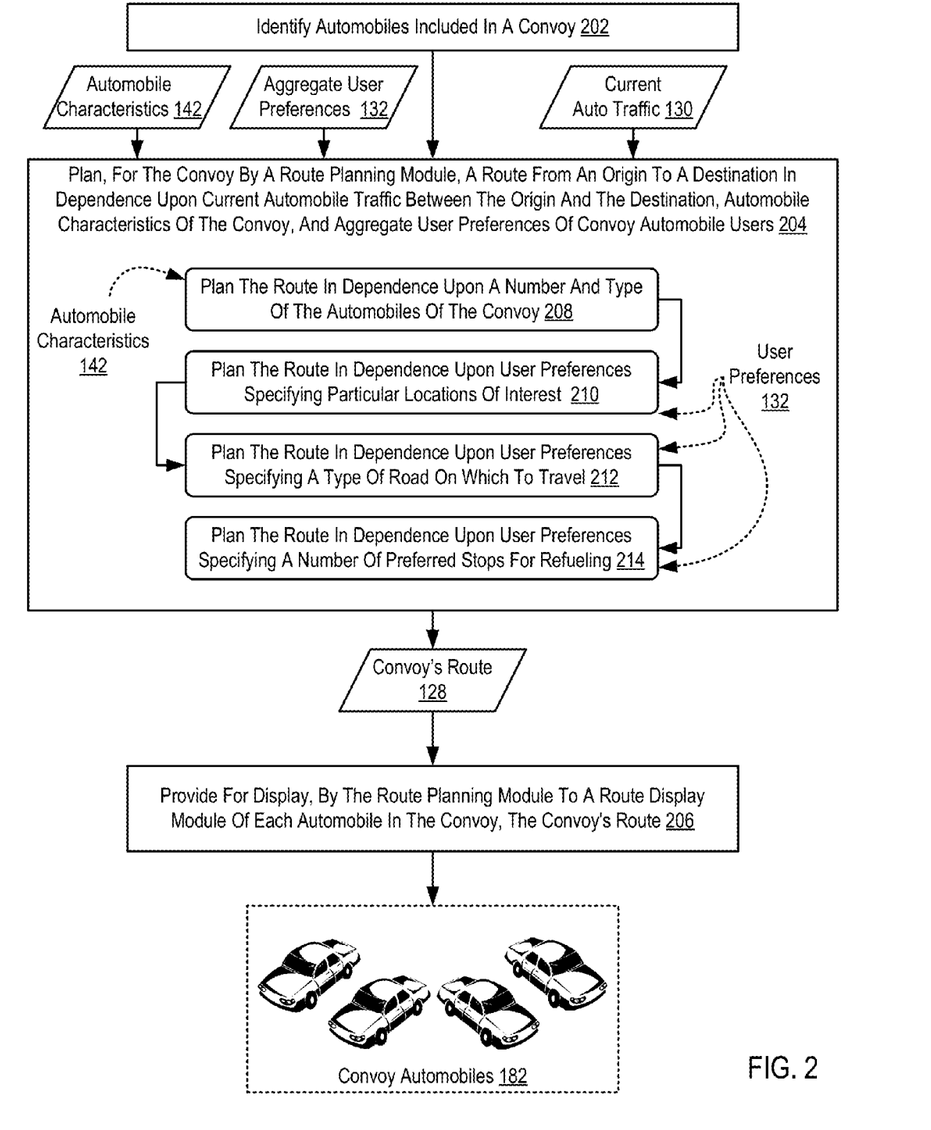
FIG. 2 sets forth a flow chart illustrating an exemplary method for planning a route for a convoy of automobiles according to embodiments of the present invention.

For further explanation, FIG. 2 sets forth a flow chart illustrating an exemplary method for planning a route for a convoy of automobiles according to embodiments of the present invention. The method of FIG. 2 includes identifying (202), by a route planning module, a plurality of automobiles (182) included in a convoy. Identifying (202), by a route planning module, a plurality of automobiles (182) included in a convoy may be carried out in a variety of ways including, for example, by receiving, through wireless or wired data communications, for each automobile from a navigation device associated with the automobile (182), a unique automobile identifier or a data structure including data describing the automobile.

The method of FIG. 2 also includes planning (204), for the convoy by a route planning module, a route from an origin to a destination in dependence upon current automobile traffic (130) between the origin and the destination, automobile characteristics (142) of the convoy, and aggregate user preferences (132) of convoy automobile users. In the method of FIG. 2, planning (204) a route for the convoy from an origin to a destination is includes planning (208) the route in dependence upon a number and type of the automobiles of the convoy. A route for a convoy of one hundred cars, for example, may be different than a route for a convoy of ten cars. Likewise, a route for a convoy of 20 sports utility vehicles with an average fuel consumption of 16 miles per gallon may be different than a route of 20 gas-electric hybrid vehicles.

Also in the method of FIG. 2, planning (204) a route for the convoy from an origin to a destination is includes planning the route in dependence upon user preferences specifying one or more of: particular locations (210) of interest; a type (212) of road on which to travel; and a number (214) of preferred stops for refueling an automobile of the convoy while traveling between the origin and the destination.

User preferences specifying particular locations (210) of interest may, for example, specify a particular tourist attraction that one driver out of the convoy prefers to view while driving from the origin to the destination, specify a particular type of restaurant at which to eat during the drive from the origin to the destination, specify particular hotels for rest while travelling from the origin to the destination, and so forth. User preferences specifying a type (212) of road on which to travel may include, for example, a user preference specifying all highway driving or all city-street driving. User preferences specifying a number (214) of preferred stops for refueling an automobile of the convoy while traveling between the origin and the destination may correspond to the type of fuel and fuel efficiency of each automobile in the convoy.

The method of FIG. 2 also includes providing (206) for display, by the route planning module to a route display module of each automobile in the convoy, the convoy's route. A route display module is a module of computer program instructions that, when executed, causes a route to be displayed. The route planning module and the route display module may, in some cases, be implemented in a single device, such as a GPS-based navigation device in an automobile.

Figure 3:
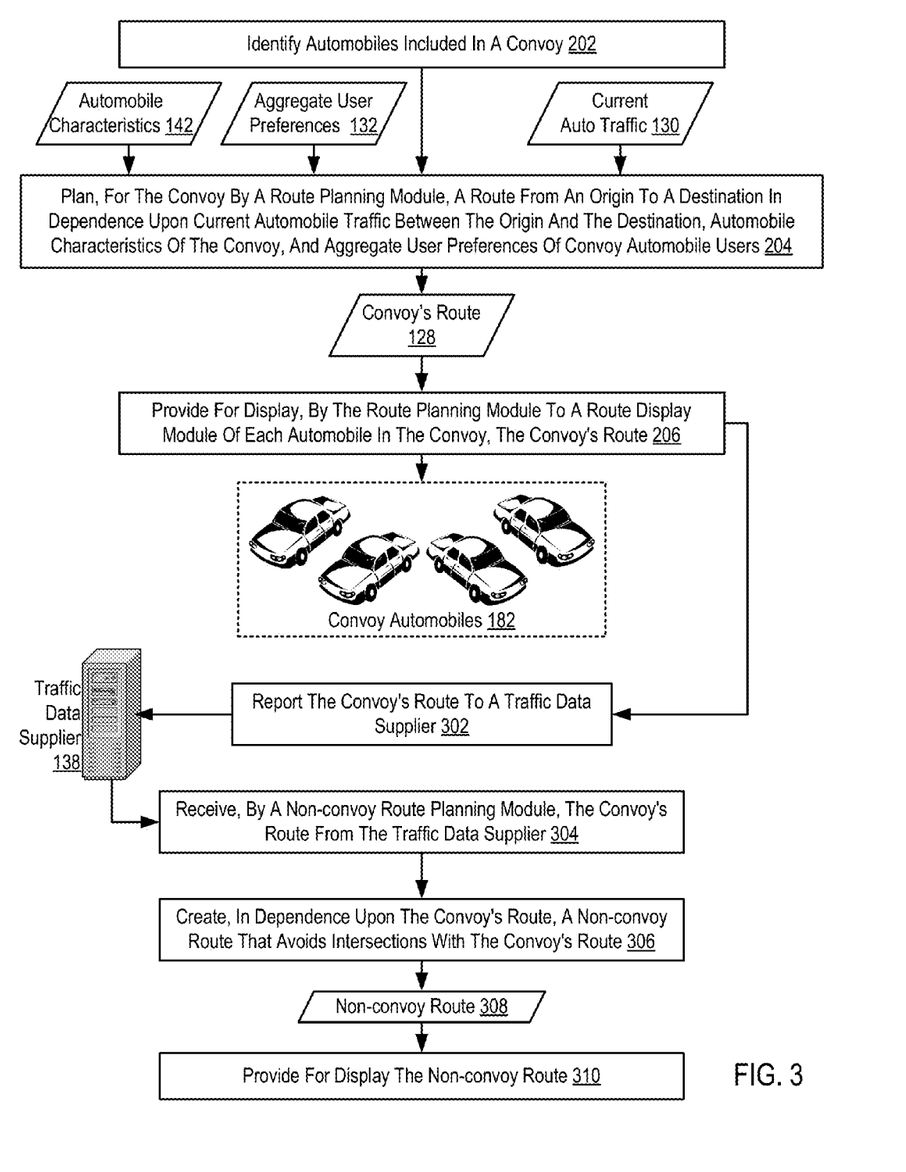
FIG. 3 sets forth a flow chart illustrating another exemplary method for planning a route for a convoy of automobiles according to embodiments of the present invention.

For further explanation, FIG. 3 sets forth a flow chart illustrating another exemplary method for planning a route for a convoy of automobiles according to embodiments of the present invention. The method of FIG. 3 is similar to the method of FIG. 2 in that the method of FIG. 3 also includes: identifying (202) automobiles included in a convoy; planning (204) a route for the convoy; and providing (206) the convoy's route to a route display module of each automobile in the convoy for display.

The method of FIG. 3 differs from that of FIG. 2, however, in that the method of FIG. 3 also includes reporting (302), by the route planning module, the convoy's route to a traffic data supplier (138). Reporting (302) the convoy's route (128) to the traffic data supplier (138) may be carried out in various ways including, for example, by sending, to the traffic data supplier (138), a data structure that includes data specifying the convoy's route (128), indicates that the route is convoy-specific, includes data describing the convoy (such as the number of cars), includes data specifying estimated departure time of the convoy, and so on. Although the convoy's route (128) may be reported to the traffic data supplier (138) at any time, in some instances the route is reported upon departure of the convoy from the origin. In this way, the traffic data supplier may provide the route to other non-convoy navigation devices at a time when the convoy is presently en route.

The method of FIG. 3 also includes receiving (304), by a non-convoy route planning module associated with an automobile not included in the convoy, the convoy's route (128) from the traffic data supplier (138). Receiving (304), by a non-convoy route planning module associated with an automobile not included in the convoy, the convoy's route (128) from the traffic data (138) supplier may be carried out upon a user-request to initiate planning of a route or periodically at predefined intervals of time.

The method of FIG. 3 also includes creating (306), by the non-convoy route planning module in dependence upon the convoy's route (128), a non-convoy route (308) that avoids intersections with the convoy's route (128). The non-convoy planning module may plan a non-convoy route by: first planning an initial route without taking into account the convoy's route, determining whether the convoy's route intersect the initial route at any point, if the convoy's route does intersect the convoy's route, re-routing a portion of the initial route such that the re-rerouted portion does not intersect the convoy's route. Further, in embodiments in which the convoy is en route when the route is provided to the traffic data supplier, the non-convoy planning module may also take into account the convoy's current location and traveling speed such that the non-convoy planning module re-routes a portion of the initial route only if the routes intersect and it is likely, given the location and speed of the convoy, the non-convoy automobile will reach the point of intersection at the same (or nearly the same) time as the convoy.

Once the non-convoy route (308) is planned, the method of FIG. 3 continues by providing (310) for display, by the non-convoy route planning module to a non-convoy route display module of the automobile not included in the convoy, the non-convoy route (308).

Readers of skill in the art will recognize that the non-convoy route (308) created (306) in the method of FIG. 3 is created statically as a first establishment of the route. In other embodiments, where a first route has been established prior to receiving the convoy's route (128), the non-convoy planning module may be configured to re-route the first route. For further explanation, FIG. 4 sets forth a flow chart illustrating another exemplary method for planning a route for a convoy of automobiles according to embodiments of the present invention. The method of FIG. 4 is similar to the method of FIG. 2 in that the method of FIG. 4 also includes: identifying (202) automobiles included in a convoy; planning (204) a route for the convoy; and providing (206) the convoy's route to a route display module of each automobile in the convoy for display.

Figure 4:
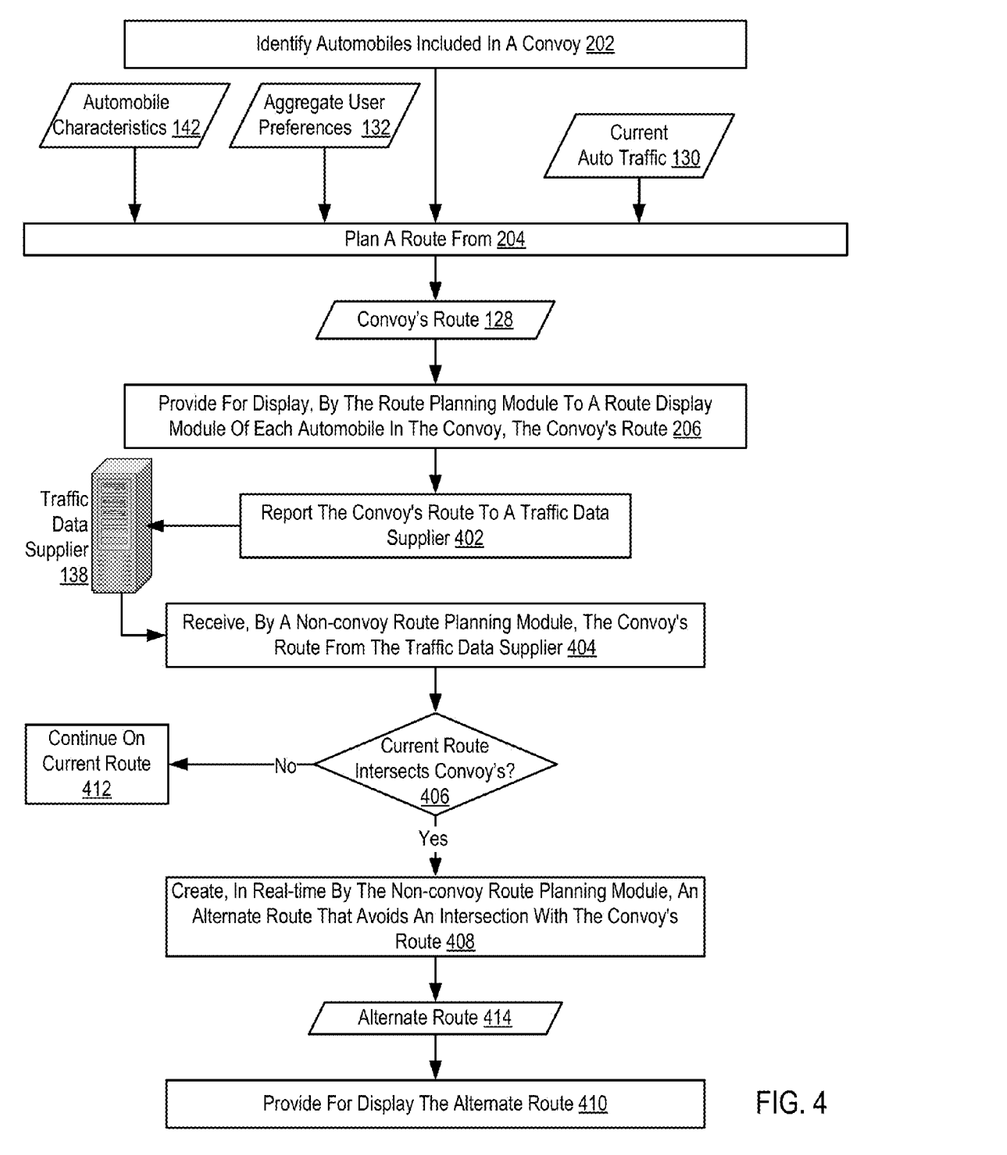
FIG. 4 sets forth a flow chart illustrating another exemplary method for planning a route for a convoy of automobiles according to embodiments of the present invention.

The method of FIG. 4 differs from that of FIG. 2, however, in that the method of FIG. 4 also includes reporting (402), by the route planning module, the convoy's route to a traffic data supplier (138) and receiving (404), by a non-convoy route planning module associated with an automobile not included in the convoy, the convoy's route from the traffic data supplier (138).

The method of FIG. 4 also includes determining (406), by the non-convoy route planning module, whether a current route of the automobile not included in the convoy intersects the convoy's route. The term 'current route' as used here refers to a route that was established for a non-convoy automobile prior to receiving the convoy's route (128) and that is being travelled when receiving the convoy's route.

If the current route of the automobile not included in the convoy does not intersect the convoy's route, the non-convoy automobile continues (412) with the current route. If, however, the current route of the automobile not included in the convoy does intersect with the convoy's route, the method of FIG. 4 continues by creating (408), in real-time by the non-convoy route planning module, an alternate route (414) that avoids an intersection with the convoy's route. Once planned, the method of FIG. 4 continues by providing (410) for display, by the non-convoy route planning module to a non-convoy route display module of the automobile not included in the convoy, the alternate route (414).

Figure 5:
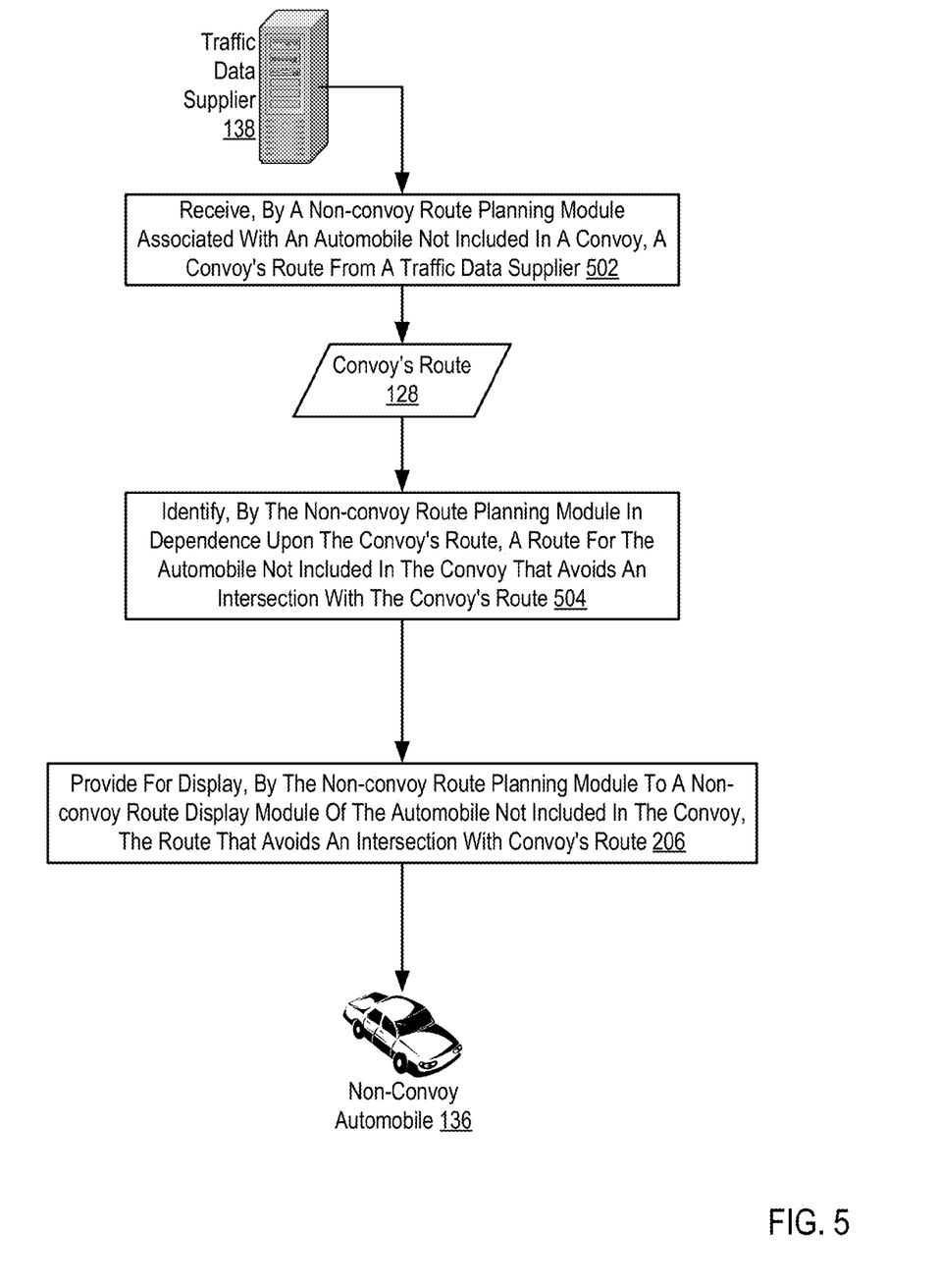
FIG. 5 sets forth a flow chart illustrating another exemplary method for planning a route for a convoy of automobiles according to embodiments of the present invention.

As mentioned above, a non-convoy automobile—or the navigation device of such an automobile may utilize a convoy's route for its own planning purposes. For further explanation, therefore, FIG. 5 sets forth a flow chart illustrating an exemplary method for planning a route for an automobile not included in a convoy. The method of FIG. 5 includes receiving (502), by a non-convoy route planning module associated with an automobile not included in a convoy, a convoy's route (128) from a traffic data supplier (138). The method of FIG. 5 also includes identifying (504), by the non-convoy route planning module in dependence upon the convoy's route (128), a route for the automobile not included in the convoy that avoids an intersection with the convoy's route. The method of FIG. 5 also includes providing (206) for display, by the non-convoy route planning module to a non-convoy route display module of the automobile not included in the convoy, the route that avoids an intersection with convoy's route.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of planning a route for a convoy of automobiles, the method comprising:
    identifying, by a route planning module, a plurality of automobiles included in a convoy;
    planning, for the convoy by the route planning module, a route from an origin to a destination in dependence upon current automobile traffic between the origin and the destination, automobile characteristics of the convoy, and aggregate user preferences of convoy automobile users, wherein planning, for the convoy, a route from an origin to a destination in dependence upon current automobile traffic between the origin and the destination, automobile characteristics of the convoy, and aggregate user preferences of convoy automobile users further comprises planning the route in dependence upon a fuel efficiency type of the automobiles of the convoy; and providing for display, by the route planning module to a route display module of each automobile in the convoy, the convoy's route.

2. The method of claim 1 further comprising:
reporting, by the route planning module, the convoy's route to a traffic data supplier;
receiving, by a non-convoy route planning module associated with an automobile not included in the convoy, the convoy's route from the traffic data supplier;
creating, by the non-convoy route planning module in dependence upon the convoy's route, a non-convoy route that avoids intersections with the convoy's route; and
providing for display, by the non-convoy route planning module to a non-convoy route display module of the automobile not included in the convoy, the non-convoy route.

3. The method of claim 1 further comprising:
reporting, by the route planning module, the convoy's route to a traffic data supplier;
receiving, by a non-convoy route planning module associated with an automobile not included in the convoy, the convoy's route from the traffic data supplier;
determining, by the non-convoy route planning module, whether a current route of the automobile not included in the convoy intersects the convoy's route;
if the current route of the automobile not included in the convoy intersects the convoy's route, creating, in real-time by the non-convoy route planning module, an alternate route that avoids an intersection with the convoy's route; and
providing for display, by the non-convoy route planning module to a non-convoy route display module of the automobile not included in the convoy, the alternate route.

4. The method of claim 1 wherein planning, for the convoy, a route from an origin to a destination in dependence upon current automobile traffic between the origin and the destination, automobile characteristics of the convoy, and aggregate user preferences of convoy automobile users further comprises planning the route in further dependence upon a number of the automobiles of the convoy.

5. The method of claim 1 wherein planning, for the convoy, a route from an origin to a destination in dependence upon current automobile traffic between the origin and the destination, automobile characteristics of the convoy, and aggregate user preferences of convoy automobile users further comprises planning the route in dependence upon user preferences specifying one or more of:
particular locations of interest;
a type of road on which to travel; and
a number of preferred stops for refueling an automobile of the convoy while traveling between the origin and the destination.

6. An apparatus for planning a route for a convoy of automobiles, the apparatus comprising a computer processor, a computer memory operatively coupled to the computer processor, the computer memory having disposed within it computer program instructions that, when executed by the computer processor, cause the apparatus to carry out the steps of:
identifying, by a route planning module, a plurality of automobiles included in a convoy;
planning, for the convoy by the route planning module, a route from an origin to a destination in dependence upon current automobile traffic between the origin and the destination, automobile characteristics of the convoy, and aggregate user preferences of convoy automobile users, wherein planning, for the convoy, a route from an origin to a destination in dependence upon current automobile traffic between the origin and the destination, automobile characteristics of the convoy, and aggregate user preferences of convoy automobile users further comprises planning the route in dependence upon a fuel efficiency type of the automobiles of the convoy; and
providing for display, by the route planning module to a route display module of each automobile in the convoy, the convoy's route.

7. The apparatus of claim 6 further comprising computer program instructions that, when executed by the computer processor, cause the apparatus to carry out the steps of:
reporting, by the route planning module, the convoy's route to a traffic data supplier;
receiving, by a non-convoy route planning module associated with an automobile not included in the convoy, the convoy's route from the traffic data supplier;
creating, by the non-convoy route planning module in dependence upon the convoy's route, a non-convoy route that avoids intersections with the convoy's route; and
providing for display, by the non-convoy route planning module to a non-convoy route display module of the automobile not included in the convoy, the non-convoy route.

8. The apparatus of claim 6 further comprising computer program instructions that, when executed by the computer processor, cause the apparatus to carry out the steps of:
reporting, by the route planning module, the convoy's route to a traffic data supplier;
receiving, by a non-convoy route planning module associated with an automobile not included in the convoy, the convoy's route from the traffic data supplier;
determining, by the non-convoy route planning module, whether a current route of the automobile not included in the convoy intersects the convoy's route;
if the current route of the automobile not included in the convoy intersects the convoy's route, creating, in real-time by the non-convoy route planning module, an alternate route that avoids an intersection with the convoy's route; and
providing for display, by the non-convoy route planning module to a non-convoy route display module of the automobile not included in the convoy, the alternate route.

9. The apparatus of claim 6 wherein planning, for the convoy, a route from an origin to a destination in dependence upon current automobile traffic between the origin and the destination, automobile characteristics of the convoy, and aggregate user preferences of convoy automobile users further comprises planning the route in further dependence upon a number of the automobiles of the convoy.

10. The apparatus of claim 6 wherein planning, for the convoy, a route from an origin to a destination in dependence upon current automobile traffic between the origin and the destination, automobile characteristics of the convoy, and aggregate user preferences of convoy automobile users further comprises planning the route in dependence upon user preferences specifying one or more of:
particular locations of interest;
a type of road on which to travel; and
a number of preferred stops for refueling an automobile of the convoy while traveling between the origin and the destination.

11. A computer program product for planning a route for a convoy of automobiles, the computer program product disposed upon a computer readable medium, the computer program product comprising computer program instructions that, when executed, cause a computer to carry out the steps of:

identifying, by a route planning module, a plurality of automobiles included in a convoy;

planning, for the convoy by the route planning module, a route from an origin to a destination in dependence upon current automobile traffic between the origin and the destination, automobile characteristics of the convoy, and aggregate user preferences of convoy automobile users, wherein planning, for the convoy, a route from an origin to a destination in dependence upon current automobile traffic between the origin and the destination, automobile characteristics of the convoy, and aggregate user preferences of convoy automobile users further comprises planning the route in dependence upon a fuel efficiency type of the automobiles of the convoy; and     providing for display, by the route planning module to a route display module of each automobile in the convoy, the convoy's route.

12. The computer program product of claim 11 further comprising computer program instructions that, when executed, cause the computer to carry out the steps of:

reporting, by the route planning module, the convoy's route to a traffic data supplier;

receiving, by a non-convoy route planning module associated with an automobile not included in the convoy, the convoy's route from the traffic data supplier;

creating, by the non-convoy route planning module in dependence upon the convoy's route, a non-convoy route that avoids intersections with the convoy's route; and     providing for display, by the non-convoy route planning module to a non-convoy route display module of the automobile not included in the convoy, the non-convoy route.

13. The computer program product of claim 11 further comprising computer program instructions that, when executed, cause the computer to carry out the steps of:

reporting, by the route planning module, the convoy's route to a traffic data supplier;

receiving, by a non-convoy route planning module associated with an automobile not included in the convoy, the convoy's route from the traffic data supplier;

determining, by the non-convoy route planning module, whether a current route of the automobile not included in the convoy intersects the convoy's route;

if the current route of the automobile not included in the convoy intersects the convoy's route, creating, in real-time by the non-convoy route planning module, an alternate route that avoids an intersection with the convoy's route; and     providing for display, by the non-convoy route planning module to a non-convoy route display module of the automobile not included in the convoy, the alternate route.

14. The computer program product of claim 11 wherein planning, for the convoy, a route from an origin to a destination in dependence upon current automobile traffic between the origin and the destination, automobile characteristics of the convoy, and aggregate user preferences of convoy automobile users further comprises planning the route in further dependence upon a number of the automobiles of the convoy.

15. The computer program product of claim 11 wherein planning, for the convoy, a route from an origin to a destination in dependence upon current automobile traffic between the origin and the destination, automobile characteristics of the convoy, and aggregate user preferences of convoy automobile users further comprises planning the route in dependence upon user preferences specifying one or more of:

particular locations of interest;

a type of road on which to travel; and a number of preferred stops for refueling an automobile of the convoy while traveling between the origin and the destination.

16. The computer program product of claim 11 wherein the computer readable medium comprises a signal medium.

17. The computer program product of claim 11 wherein the computer readable medium comprises a storage medium.

* * * * *